United States Patent [19]
Gustafson et al.

[11] Patent Number: 5,927,845
[45] Date of Patent: *Jul. 27, 1999

[54] INTEGRALLY FORMED LINEAR LIGHT STRIP WITH LIGHT EMITTING DIODES

[75] Inventors: Thomas L. Gustafson, Southfield, Mich.; Richard Mental, Indianapolis, Ind.

[73] Assignee: StanTech, Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/520,237

[22] Filed: Aug. 28, 1995

[51] Int. Cl.$^6$ .................................................. F21V 23/00
[52] U.S. Cl. ........................ 362/152; 362/153.1; 362/800
[58] Field of Search .................................... 362/235, 103, 362/800, 147, 152, 145, 153, 153.1, 125

[56] References Cited

U.S. PATENT DOCUMENTS

| | | |
|---|---|---|
| 3,463,913 | 8/1969 | Shavalier . |
| 3,996,556 | 12/1976 | Eigenmann . |
| 4,173,035 | 10/1979 | Hoyt ......................................... 362/125 |
| 4,347,499 | 8/1982 | Burkman, Sr. et al. . |
| 4,376,966 | 3/1983 | Tieszen . |
| 4,396,972 | 8/1983 | Kaneko et al. . |
| 4,439,818 | 3/1984 | Scheib ..................................... 362/800 |
| 4,471,412 | 9/1984 | Mori . |
| 4,581,687 | 4/1986 | Nakanishi . |
| 4,597,033 | 6/1986 | Meggs et al. . |
| 4,761,720 | 8/1988 | Solow ..................................... 362/800 |
| 4,774,434 | 9/1988 | Bennion . |
| 4,860,182 | 8/1989 | Vadseth . |
| 4,954,931 | 9/1990 | Hassler, Jr. . |
| 4,999,755 | 3/1991 | Lin . |
| 5,032,960 | 7/1991 | Katoh ..................................... 362/800 |
| 5,107,408 | 4/1992 | Vernondier ............................. 362/800 |
| 5,130,909 | 7/1992 | Gross . |
| 5,155,669 | 10/1992 | Yamuro .................................. 362/800 |
| 5,162,696 | 11/1992 | Goodrich ............................... 362/800 |
| 5,193,895 | 3/1993 | Naruke et al. ......................... 362/800 |
| 5,222,799 | 6/1993 | Sears et al. ............................ 362/800 |
| 5,321,593 | 6/1994 | Moates ................................... 362/800 |
| 5,335,151 | 8/1994 | Dahlberg . |
| 5,336,345 | 8/1994 | Gustafson et al. . |
| 5,337,225 | 8/1994 | Brookman .............................. 362/226 |
| 5,371,657 | 12/1994 | Wiscombe .............................. 362/103 |
| 5,390,090 | 2/1995 | Nau . |
| 5,404,282 | 4/1995 | Klinke et al. . |
| 5,414,293 | 5/1995 | Broom . |
| 5,414,603 | 5/1995 | Conway . |
| 5,418,384 | 5/1995 | Yamana et al. . |
| 5,450,301 | 9/1995 | Waltz et al. ........................... 362/800 |
| 5,490,049 | 2/1996 | Montalan et al. . |
| 5,519,596 | 5/1996 | Woolverton . |
| 5,559,681 | 9/1996 | Duarte . |

OTHER PUBLICATIONS

A Better Way To Save Lives!—Path Marking System From Sure–Lites, ADV950022, 38 pgs.
Sure–Lites Parts Brochure—ADV940089, ADV940090, ADV940091, ADV940092, ADV940093, ADV90094, ADV90095, ADV940098; 8 pgs.
LifeWay Path Marking System, Sure–Lites, products catalog, 6 pgs. (1995).

*Primary Examiner*—Laura Tso
*Attorney, Agent, or Firm*—Harness, Dickey & Pierce, P.L.C.

[57] ABSTRACT

An integral single piece extruded LED light strip and an associated process for producing such an LED light strip. The light strip includes first and second bus elements spaced apart from one another by a predetermined distance. The light strip also includes at least one light emitting diode (LED) connected between the bus elements that is illuminated when the first bus element conducts electricity provided from a power source. An extruded plastic material completely encapsulates the first and second bus elements and the LED, thereby providing a barrier to protect the elements from damage and to make the light strip impervious to moisture. A process for manufacturing an integrally formed single piece light strip includes the steps of continuously feeding bus elements to an extruder; continuously feeding circuitry having at least one LED operatively mounted thereon to the extruder; and extruding a thermoplastic material at a temperature below that which would damage the circuitry or the LED to thereby encapsulate the bus elements, the circuitry and the LED and to operatively connect the circuitry to the bus elements.

28 Claims, 4 Drawing Sheets

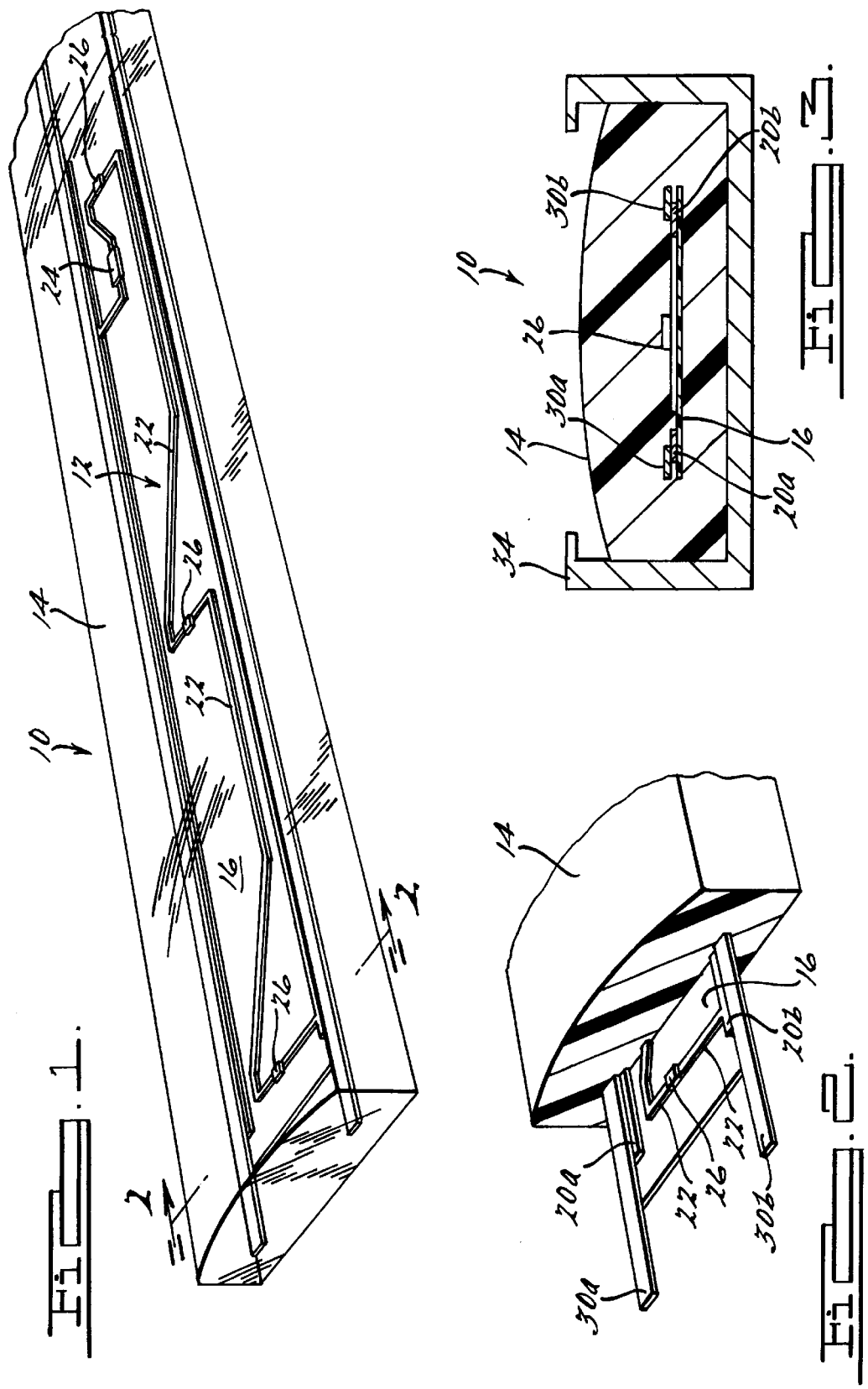

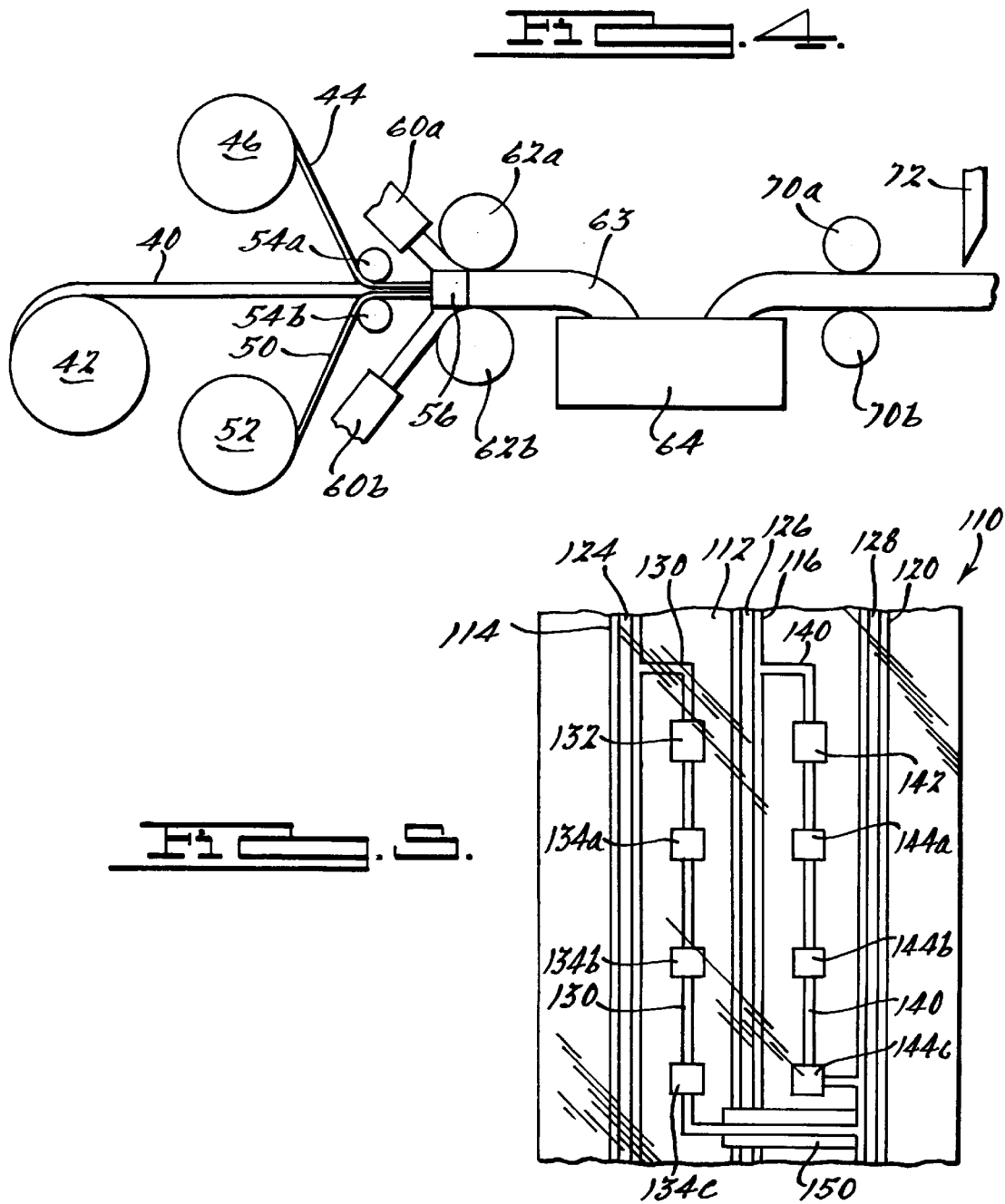

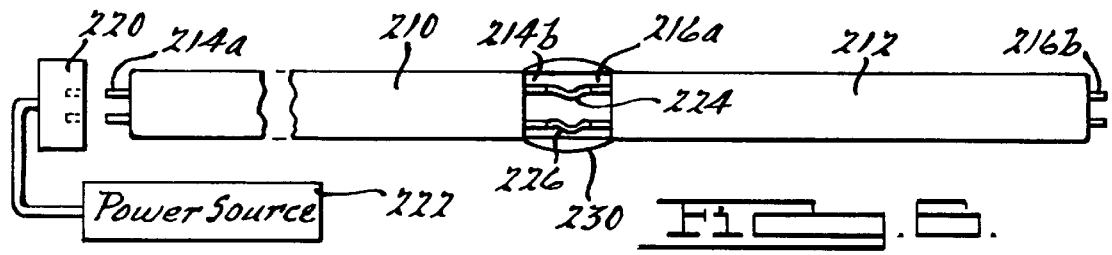
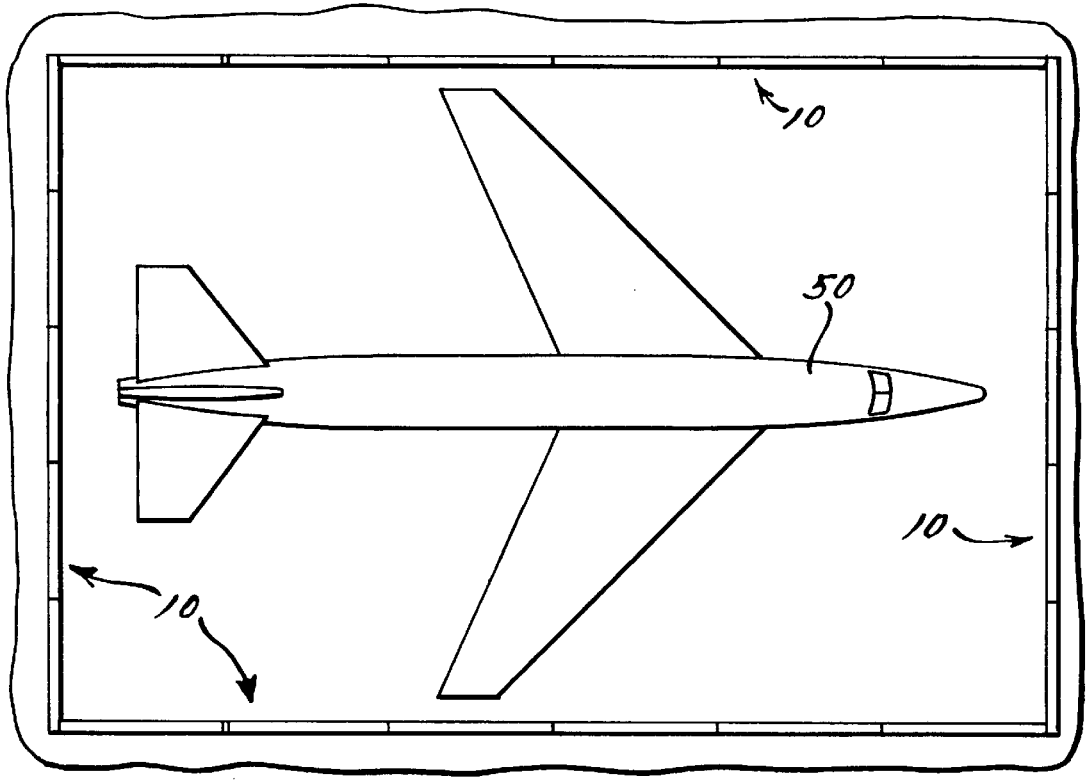
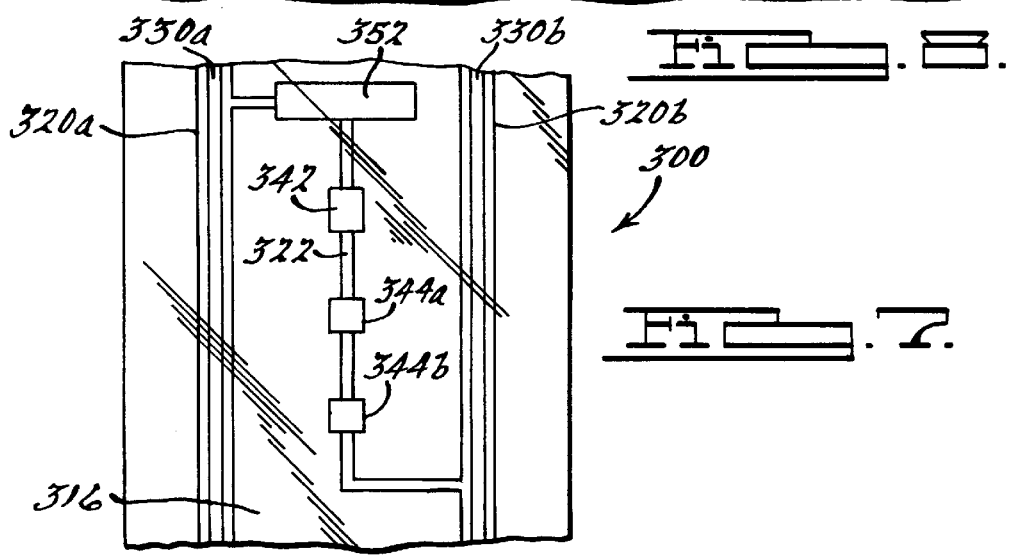

INTEGRALLY FORMED LINEAR LIGHT STRIP WITH LIGHT EMITTING DIODES

BACKGROUND OF THE INVENTION

The present invention relates generally to light strips and, more particularly, to an integral single piece light strip containing light emitting diodes, and a process for forming such a light strip, in which the diodes and associated circuitry are protected from moisture ingress and from other potential causes of damage.

Light emitting diode (LED) light strips are commonly used to provide visual pathways or marked locations in otherwise dark, unlit areas. Such LED light strips are advantageous when compared to bulb or lamp-based markers in that the strips are relatively inexpensive to manufacture and are relatively easy to install. Further, the LEDs used in these light strips typically have a longer life than conventional lamps or bulbs.

Present LED light strips consist of circuitry including a plurality of LEDs mounted on a substrate and connected to electrical conductors. The circuitry is encased within a tube-like, partially transparent protective sheathing and connected to a power source for selective LED illumination. Two exemplary types of LED strips are described generally in U.S. Pat. No. 5,130,909 to Gross, issued Jul. 14, 1992 and entitled "Emergency Lighting Strip" and U.S. Pat. No. 4,597,033 to Meggs et al., issued Jun. 24, 1986 and entitled "Flexible Elongated Lighting System." Such strips are utilized in a variety of indoor and outdoor configurations such as emergency pathway markers, exit door indicators and ornamental lighting arrangements.

Regardless of the application, it is imperative that the LED circuitry is housed within some type of protective sheathing. The protective sheathing must be of sufficient strength to prevent damage to the circuitry due to excessive loads, such as the weight of machinery, being directly applied to the strip. Further, because the LED circuitry is highly susceptible to damage and malfunction caused by exposure to moisture, the protective sheathing must be impervious to moisture.

While the aforementioned LED light strips protect the circuitry housed within, the strips have associated limitations. The tube-like sheathings typically used as housings for present LED light strips provide minimal protection against mechanical damage to the LED circuitry due to excessive loads placed on the sheathings. Further, the aforementioned light strips provide the LED circuitry with only limited protection from moisture. The sheathing seals or strip ends through which the LED circuitry is inserted are typically susceptible to moisture penetration. Further, protective sheathings such as those described in the above-mentioned patents are substantially hollow, thereby increasing the susceptibility of such sheathings to moisture condensation. As a result, such light strips often prove to be unreliable from a moisture protection standpoint, especially in outdoor lighting applications or other applications in which the strips are exposed to extreme weather conditions. Consequently, it would be desirable to encase the LED circuitry in a more permanent type of protective sheathing that did not have the above mentioned drawbacks associated with tube-like sheathings.

One such type of permanent protective sheathing is commonly used for encapsulating electroluminescent (EL) lamps and is formed by sealing a multi-layer EL lamp configuration by a conventional sheet, or hard, lamination process. In this conventional hard lamination process, a top layer of protective film is either adhesively bonded or thermally fused to a bottom layer of protective film through the use of high temperatures and high pressure rollers, thereby sandwiching the EL lamps between the layers.

While EL strips formed through the above hard lamination process provide a layer of protection, the multi-layer EL lamps housed within such strips are also susceptible to moisture damage. Moisture is often capable of penetrating into the interior of the two-piece strips through the fused or bonded seal joining the two-piece housing, especially when the strips are utilized in outdoor applications or after the bonded or fused seal connecting the two-piece housing weakens upon aging of the strip. In addition, such a hard lamination process would not be desirable for use with LED circuitry. EL lamps include multiple layers of substantially flat conductive and non-conductive material that are easily sandwiched between top and bottom laminate layers. Conversely, because LEDs in LED light strips typically have a height of 0.040 inch or more, the high pressure rollers typically used to bond or fuse the two-piece housing could crush protruding LEDs during formation of an LED strip. In addition, the high temperatures associated with the bonding or fusing steps in a hard lamination process would subject the LEDs and associated circuitry to heat damage, thus rendering an LED strip manufactured by such a process nonfunctional.

Therefore, a need exists for an improved single piece integral LED light strip that is impervious to moisture and that provides a high degree of protection against other forms of potential damaging elements. There also exists a need for a soft lamination process for producing such an elongated single piece integral LED light strip in which a protective housing encapsulates the LED circuitry so that an integral single piece LED light strip is produced in a cost effective manner without subjecting the circuitry to damaging high pressures or high temperatures.

SUMMARY OF THE INVENTION

Accordingly, the present invention relates to an integral single piece extruded LED light strip having first and second bus elements spaced apart from one another by a predetermined distance and being operatively connected to a power source to conduct electricity. Further, at least one light emitting diode (LED) is connected between the bus elements and is illuminated when the bus elements conduct electricity provided from the power source. An extruded soft laminate plastic material completely encapsulates the first and second bus elements and the LED, and urges the first and second bus elements and the LED into operative contact. Further, the extruded plastic material provides a barrier that protects the elements from damage and makes the light strip impervious to moisture.

The present invention also relates to a soft lamination process for manufacturing an integrally formed single piece light strip. The process includes the steps of continuously feeding bus elements to an extruder; continuously feeding circuitry having at least one LED operatively mounted thereon to the extruder; and extruding a thermoplastic at a temperature below that which would damage the circuitry to thereby encapsulate the bus elements and the circuitry and to operatively connect the circuitry to the bus elements.

These and other various advantages and features of the present invention will become apparent from the following description and claims, in conjunction with the appended drawings.

BRIEF DESCRIPTION OF THE DRAWINGS

FIG. 1 is a perspective view illustrating a light strip according to a preferred embodiment of the present invention;

FIG. 2 is a perspective view, partially in cross-section and broken away, illustrating the LED circuitry encapsulated within the plastic material;

FIG. 3 is a cross-sectional view of the strip shown in FIG. 1 mounted into a protective track;

FIG. 4 is a schematic view illustrating a process for manufacturing the LED light strip according to the present invention;

FIG. 5 illustrates a second embodiment of the present invention;

FIG. 6 illustrates a third embodiment of the present invention;

FIG. 7 illustrates a fourth embodiment of the present invention;

FIG. 8 is a plan view illustrating the implementation of multiple discrete segments of an LED light strip of the type shown in FIG. 1 to illuminate a section of an airport taxiway.

DETAILED DESCRIPTION OF THE PREFERRED EMBODIMENTS

Figure 9A:
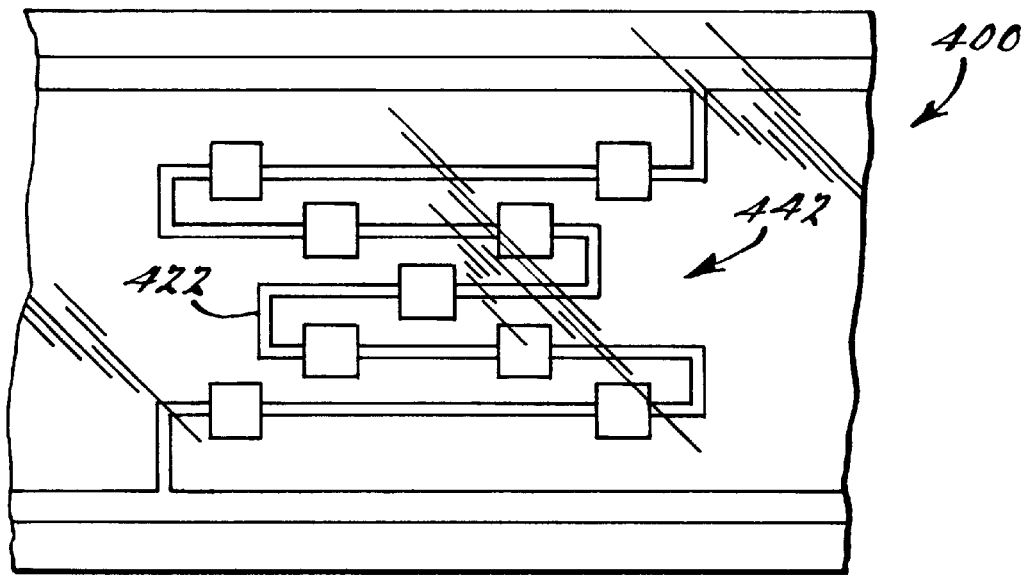
FIGS. 9A–9B are plan views illustrating alternative configurations of LEDs implemented in the LED light strip of the present invention.

Referring to the drawings, an LED light strip according to the preferred embodiment of the present invention is shown generally at 10 in FIG. 1. The light strip includes LED circuitry, shown generally at 12 and described in detail below, encapsulated within an integral single piece thermoplastic housing 14 having no internal voids. Thus, the light strip 10 is not only durable and capable of withstanding considerable loads, but also is impervious to moisture, and thereby protects the LED circuitry 12 from damage due to moisture ingress. The thermoplastic housing 14 is preferably composed of a low vapor transmission rate polymeric material such as Surlyn®, an ionomer resin, a high density polyethylene, or polychlorotrifluoroethylene.

FIG. 2 shows the light strip of FIG. 1 with the housing partially cut away along sectional line 2—2 to reveal the encapsulated LED circuitry. As shown in FIG. 2, the LED circuitry 12 is mounted on a substrate 16 containing a printed circuit. Preferably, the substrate is a polyester film having a thickness of approximately 0.005 inches. However, any substrate, such as a fiberglass or a polyimide substrate, exhibiting parameters necessary for the manufacturing process described below may be used. The printed circuit includes conductive bus contacts 20a, 20b that extend longitudinally through the length of the strip and that are operatively connected to the printed circuit tracks 22. A resistor 24 (FIG. 1) and light emitting diodes (LEDs) 26 of the type well known in the art are operatively contacted to the PCB tracks 22 between the conductive bus contacts 20a, 20b. The printed circuit bus contacts 20a, 20b electrically contact bus elements 30a, 30b, respectively, which also extend longitudinally through the length of the strip. As will be described in more detail below, bus elements 30a, 30b are connected to a remote power source. Therefore, electricity is selectively supplied over the bus elements 30a, 30b from a remote power source to illuminate the LEDs 26 in response to certain predetermined conditions dependent upon the particular light strip application. While FIG. 1 shows three LEDs 26 mounted on the substrate 16, it should be appreciated at this point that any number of LEDs may be implemented in a similar manner.

FIG. 3 illustrates a cross-sectional view of the light strip shown in FIG. 1. According to the preferred embodiment of the present invention, the light strip is approximately 0.4 inches in height and 1.3 inches in width. Also, as shown in FIG. 3, if a particular application so dictates, the LED light strip may be mounted in a protective track 34 formed from aluminum or a high density plastic. The strip is pulled into the aluminum track from one end and then is permanently attached to the track through the use of a bonding agent of the type well known in the art. Subsequent to the formation of a shallow channel in a concrete, asphalt or other similar surface through use of a cutting tool well known in the art, the track 34, and the light strip housed within, may be inserted into the channel and thus flush mounted with the finished surface with negligible effect on surface integrity. Thus, the track 34 provides additional protection to the light strip from large loads placed upon the light strip and further facilitates the flush mounting of the light strip in areas such as an airport taxiway or an automobile highway. Such a light strip/track system could include light strips using different color lamps that could alternately be activated or flashed as required by a central control such as an airport control tower. It is also contemplated that such a system could be designed to conform to the pertinent sections of FAA Circular AC150/5345-46A.

FIG. 4 illustrates a dual extrusion assembly line for manufacturing an LED light strip according to a preferred embodiment of the present invention. As shown, a continuous length of LED light strip substrate mounted LED circuitry 40 including resistors and LEDs operatively mounted to a printed circuit on the substrate is fed from an LED light strip roll 42. Although a continuous length of LED light strip substrate is shown being fed from the roll 42, it should be appreciated that discrete sections of light strip substrate could also be individually fed from the roll 42 or other similar feed mechanism. A first continuous length of a first bus element 44 is fed from a first bus element roll 46. Similarly, a second continuous length of a second bus element 50 is fed from a second bus element roll 52. As with the light strip substrate, the bus elements 44, 50 could also be fed in discrete sections rather than in a continuous length manner. The bus elements may be fed in a manner so that the elements are positioned above or below the conductive bus contacts of the substrate as desired. The continuous lengths of the substrate-mounted LED circuitry 40 and bus elements 44 and 50 are brought together through feeder rolls 54a and 54b, and are then fed into a molten thermoplastic stream supplied from extruders 60a and 60b in the form of both a top layer and a bottom layer. The thermoplastic material is extruded at a temperature less than 350° F., the temperature at which thermal distortion of the LEDs and wrinkling of the polyester substrate occurs. However, the extrusion temperature may vary according to the particular type of thermoplastic material used and the particular process parameters.

Once the extruders 60a and 60b have encapsulated the circuitry and the bus elements within the single piece housing, top and bottom layers of extruded thermoplastic material are each individually profiled by forming rolls 62a, 62b upon exit of the die 56 at a temperature of approximately 340° F. It should be noted that the distance traveled from the die to the forming rolls 62a, 62b may be varied to allow for various degrees of cooling of the newly formed strip in relation to the particular mass of the extruded strip.

It should be further appreciated that, through this profiling, both the top layer and the bottom layer of extruded material may breathe, allowing for control of extruded material displacement upon introduction of the substrate mounted LED circuitry into the extrusion, and therefore allowing excess extruded material to be vented to the side and trimmed by a strip trimmer (not shown).

Upon exiting the die and passing through the forming rolls 62a, 62b, the newly formed LED light strip 63 is fed into a cooling tank 64. Preferably, the cooling tank contains cooled water into which the newly formed strip 63 is immersed for a predetermined amount of time. After this predetermined amount of time, the LED light strip 63 is fed from the cooling tank 64 through feed rollers 70a, 70b to a cutting machine 72 of the type well known in the art and is cut into discrete segments of a predetermined length. The light strip may be cut into discrete segments corresponding to the discrete printed circuits printed on the polyester substrate to which the LEDs are electrically contacted. The extruded thermoplastic material thus encapsulates the substrate mounted LED circuitry and the bus elements in a single piece housing. Because each of the individual LEDs in the strip array are sealed in the thermoplastic material formed in the housing, the LEDs are isolated from one another. Thus, as the LED light strip is cut to a desired length between any discrete printed circuit formed on the polyester substrate, the LED configurations will not be exposed.

FIG. 5 shows an alternate embodiment of the present invention generally at 110. With the light strip 110, a substrate 112 includes conductive bus contacts 114, 116, 120 which electrically contact bus elements 124, 126, 128. The bus elements 124 and 126 and the corresponding conductive bus contact strips 114 and 116 are positioned adjacent to one another, with contact strip 120 and the corresponding bus element 128 being located on the far right side of the strip 110. The printed circuit track 130 is thus connected between the bus contact 114 and the bus contact 120, while the printed circuit track 140 is connected between the bus contact 116 and the bus contact 120. A resistor 132 and LEDs 134a–134c are electrically contacted to the printed circuit track 130, while a resistor 142 and LEDs 144a–144c are electrically contacted to the printed circuit 140. To prevent the printed circuit track 130 from electrically contacting the bus contact 116, a nonconductive pad 150 is located between the bus element 126 and the printed circuit track 130 to insulate the track 130 from electrical contact with the bus element.

FIG. 6 shows the electrical interconnection of two LED light strips 210 and 212. As shown, a first end of the light strip 210 includes an electrical connector 214a, while a second end includes an electrical connector 214b. Similarly, the light strip 212 includes a first end having an electrical connector 216a that mates with the connector 214b of the light strip 210. A second end of the light strip 212 includes an electrical connector 216b for connection with another light strip or with a terminating element (not shown). The connector 214a shown is capable of mating with an electrical socket 220 of a remote power source 222 for providing electrical power to the light strip. As shown, the electrical connectors 214a, 214b and 216a, 216b are metal connector pins heat staked into the thermoplastic to contact the strip bus elements for interconnection of the light strips or for connection of light strips to the power source 22. Corresponding pins in the strips may be interconnected by wires 224, 226 and then encased within a protective covering 230. The electrical connectors may also be of the type such as the connector disclosed in U.S. Pat. No. 5,391,088, assigned to AMP, Inc. and entitled "Surface Mount Coupling Connector", hereinafter incorporated by reference. Alternatively, the housing encapsulating the bus elements could be stripped away from the bus elements and the bus elements could be interconnected or connected to a remote power source through conventional wiring techniques.

FIG. 7 illustrates another preferred embodiment of the present invention, which is shown generally at 300. The light strip includes a substrate 316 including printed circuit bus contacts 320a, 320b electrically contacting bus elements 330a, 330b and PCB tracks 322 connected between the bus contacts 320a, 320b. A resistor 342 and LEDs 344a, 344b are mounted to the PCB tracks 322 and are selectively illuminated when the bus elements 330a, 330b conduct electricity supplied from a remote power source. However, the LED light strip 310 also includes a microcontroller 352 of the type well known in the art. The microcontroller 352 makes the strip 300 addressable so that the LED circuitry contained within the LED light strip may be pulsed or selectively illuminated in a particular pattern in order to more clearly mark a particular pathway.

FIG. 8 illustrates one contemplated environment in which the multiple light strips 10 of the present invention may be implemented. In this particular environment, discrete sections of light strips are inserted into protective flush mounted tracks such as the track 34 and electrically interconnected by aforementioned means to form an airport holding box for a jet airplane 50. It is contemplated that implementation of these light strips for airplane holding boxes or for actual runway lighting would more clearly mark such pathways than presently used and more expensively implemented lighting systems. In addition, the LED light strip of the present invention represents a significant improvement over conventional airport lighting systems, such as halogen MR-16 light systems, in that LED light strips can be surface mounted to the runways with only minor disturbance to the actual integrity of the runway surface, as the light strip of the present invention eliminates the necessity of burying cables associated with typical runway light systems. Further, because the LED light strips are surface mounted, additional complications, such as problems often encountered with ground water tables, are avoided.

Figure 9B:
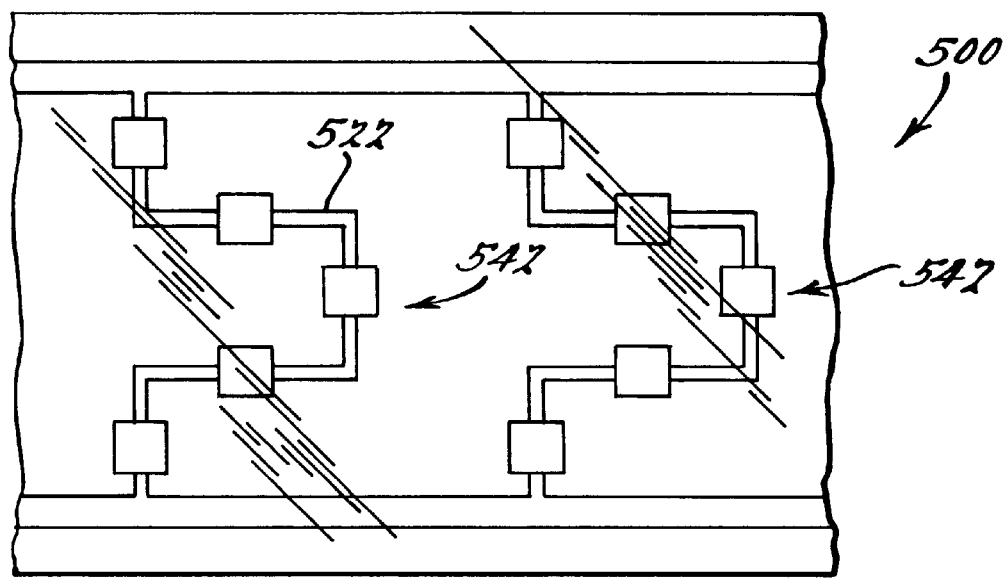

It is also contemplated that the LED light strips of the present invention may be manufactured and implemented with any number of desired rows or configurations of encapsulated LEDs. FIGS. 9A and 9B show two such alternative configurations. The LED light strip shown at 400 in FIG. 9A includes a plurality of LEDs, indicated generally at 442, configured on a PCB track 422 to form an X. The LED light strip shown at 500 in FIG. 9B includes a plurality of LEDs, indicated generally at 542, configured on a PCB track 522 to form an arrow or chevron. Strips such as those shown at 400 and 500 could be correspondingly utilized in conjunction with a microcontroller, such as the microcontroller 352 shown in FIG. 7, to selectively indicate either a STOP or a GO condition in response to a particular runway or other type of traffic environment condition.

It should be appreciated that any number of bus wires may be run and any number of rows or configuration of substrate mounted LED circuits may be electrically connected to the bus elements in the process described above.

Further, it should be appreciated that the LED light strip of the present invention is completely impervious to moisture ingress and may therefore be used in certain underwater applications such as for aquarium or pool lighting. Use of such LED light strips could result in savings over current lighting systems.

It should also be appreciated that the LED light strips may be formed in a variety of cross-sectional shapes, such as rectangular, bowed, elliptical or any other desired shape through the above-described process through manipulation of the thermoplastic extruder on the shaping rollers in a manner well known in the art.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

We claim:

1. An integrally formed single piece light strip, comprising:
   a flexible substrate including a light strip circuit with at least one light emitting diode (LED) that is illuminated when the light strip circuit conducts electricity;
   first and second bus elements spaced apart from one another by a predetermined distance and being in electrical communication with said light strip circuit; and
   a semi-rigid homogeneous plastic material extruded around said first and second bus elements, said flexible substrate including a light strip circuit, and said at least one LED, completely encapsulating said flexible substrate, said first and second bus elements and said LED to form a single piece, seamless, substantially voidless protective barrier.

2. The light strip of claim 1, further comprising at least one resistor connected in series with said LED between said first and second bus elements.

3. The light strip of claim 1, further comprising a first plurality of LEDs connected between said first and second bus elements.

4. The light strip of claim 3, further comprising a substrate strip having a plurality of discrete printed circuits thereon, said LEDs being mounted on said discrete printed circuits to permit said light strip to be cut into discrete segments corresponding to said discrete printed circuits.

5. The light strip of claim 4, wherein said substrate strip comprises a polyester substrate strip.

6. The light strip of claim 4, wherein said substrate strip comprises a fiberglass substrate strip.

7. The light strip of claim 4, wherein said substrate strip comprises a polyimide substrate strip.

8. The light strip of claim 1, further comprising a third bus element operatively connected to said power source;
   at least one resistor operatively connected in parallel between said third bus element and said second bus element; and
   at least one LED connected in series with said at least one resistor.

9. The light strip of claim 8, further comprising a non-conductive layer located across a top portion of said first and third bus elements for insulating said at least one resistor and said at least one LED connected between said third and second bus elements from electrical contact with said first bus element and for insulating said at least one resistor and said at least one LED connected between said first and second bus elements from electrical contact with said third bus element.

10. The light strip of claim 1, further comprising a partially transparent layer of non-conductive material containing indicia thereon imbedded between a top surface of said extruded plastic material and said LED, said indicia being illuminated upon illumination of said LED.

11. The light strip of claim 1, wherein said extruded plastic material comprises an ionomer resin.

12. The light strip of claim 1, wherein said extruded plastic material comprises a high density polyethylene.

13. The light strip of claim 1, wherein said extruded plastic material comprises polychlorotrifluoroethylene.

14. The light strip of claim 1, further comprising a polyester substrate on which said LED is mounted.

15. An integrally formed light strip, comprising:
    a flexible light strip circuit;
    a plurality of light emitting diodes (LEDs) mounted on said flexible light strip circuit for electrical communication with a power source; and
    a homogeneous thermoplastic material extruded about said light strip circuit and said plurality of LEDs that completely encapsulates said substrate and said plurality of LEDs to form a single piece seamless protective barrier.

16. The light strip of claim 15, wherein said substrate comprises a polyester material.

17. The light strip of claim 15, further comprising:
    a printed circuit formed on said substrate to which said LEDs are contacted; and
    bus elements encapsulated within said extruded thermoplastic material and contacting said printed circuit for electrically connecting said light emitting diode to said power source.

18. The light strip of claim 15, further comprising a second row of light emitting diodes electrically contacted to said substrate for electrical communication with said power source, said second row of light emitting diodes being completely encapsulated within said extruded thermoplastic material.

19. The light strip of claim 15, wherein said extruded thermoplastic material protects said LEDs from moisture damage and mechanical damage due to loads being directly placed on said light strip.

20. The light strip of claim 15, further comprising an elongated channeled track for housing said light strip.

21. The light strip of claim 15, further comprising an adhesive secured to a bottom surface of said extruded thermoplastic material for maintaining said light strip in a predetermined location.

22. The light strip of claim 15, further comprising a second light strip spaced apart from and electrically connected to said integrally formed light strip.

23. The light strip of claim 15, wherein said LEDs are encapsulated such that said light strip may be severed into discrete sections.

24. The light strip of claim 15, further comprising a semitransparent film encapsulated in said extruded thermoplastic material over said plurality of light emitting diodes for providing a decorative appearance when said plurality of light emitting diodes are not illuminated and for passing light when said plurality of light emitting diodes are illuminated.

25. A light strip, comprising:
    a seamless single piece extruded housing;
    a plurality of longitudinally extending electrical conductors encapsulated within the extruded housing that conduct electricity therethrough; and
    a plurality of light emitting diode (LED) circuits, including a plurality of LEDs mounted thereon, encapsulated within the extruded housing, the extruded housing electrically connecting the plurality of conductors with the plurality of LED circuits.

26. The light strip of claim 25, further comprising a flexible substrate populated with the plurality of LED circuits;
    the light strip being severable between each of the plurality of circuits to form a plurality of discrete light strips.

27. The light strip of claim 26, wherein the plurality of LED circuits is printed on the flexible substrate.

28. An integrally formed single piece light strip, comprising:

first and second bus elements spaced apart from one another by a predetermined distance and being operatively connected to a power source;

at least one light emitting diode (LED) connected between said first and second bus elements, said LED being illuminated upon said bus elements conducting electricity; and an extruded homogeneous plastic material that completely encapsulates said first and second bus elements and said LED and that provides a protective barrier and for making said light strip impervious to moisture;

a third bus element operatively connected to said power source;

at least one resistor operatively connected in parallel between said third bus element and said second bus element;

at least one LED connected in series with said resistor; and a non-conductive layer located across a top portion of said first and third bus elements for insulating said resistor and said LED connected between said third and second bus elements from electrical contact with said first bus element and for insulating said resistor and said LED connected between said first and second bus elements from electrical contact with said third bus element.

\* \* \* \* \*